(12) United States Patent
Milli

(10) Patent No.: US 6,821,315 B2
(45) Date of Patent: Nov. 23, 2004

(54) APPARATUS AND METHOD FOR SPRAY-PAINTING

(75) Inventor: Ottavio Milli, Istia d'Ombrone (IT)

(73) Assignee: Eurosider S.a.S. di Milli Ottavio & C., Grosseto (IT)

( * ) Notice: Subject to any disclaimer, the term of this patent is extended or adjusted under 35 U.S.C. 154(b) by 0 days.

(21) Appl. No.: 10/349,313

(22) Filed: Jan. 23, 2003

(65) Prior Publication Data

US 2003/0172807 A1 Sep. 18, 2003

(30) Foreign Application Priority Data

Jan. 25, 2002 (EP) .............................. 02425028

(51) Int. Cl.⁷ .............................................. B01D 53/22
(52) U.S. Cl. .................. 95/18; 95/19; 95/52; 95/54; 96/8; 55/DIG. 46
(58) Field of Search ................. 95/17–19, 22, 95/45, 52, 54; 96/4, 8, 10; 55/DIG. 46

(56) References Cited

U.S. PATENT DOCUMENTS

| | | | | |
|---|---|---|---|---|
| 3,369,343 A | * | 2/1968 | Robb ............................. 95/46 |
| 3,737,626 A | | 6/1973 | Davis et al. ................. 219/360 |
| 4,781,907 A | * | 11/1988 | McNeill ....................... 423/351 |
| 5,131,929 A | * | 7/1992 | Brockmann et al. ........... 95/52 |
| 5,214,740 A | | 5/1993 | Carroll ......................... 392/481 |
| 5,388,413 A | * | 2/1995 | Major et al. ................... 62/640 |
| 5,681,368 A | * | 10/1997 | Rahimzadeh ................... 95/19 |
| 5,840,098 A | | 11/1998 | Barbe et al. .................... 95/18 |
| 6,126,724 A | * | 10/2000 | Martin et al. ..................... 96/4 |
| 6,235,087 B1 | * | 5/2001 | Chevalier et al. ................ 96/9 |
| 6,290,750 B1 | * | 9/2001 | Ollivier et al. ................. 95/19 |
| 6,579,344 B1 | * | 6/2003 | Diserens ......................... 95/54 |
| 6,616,735 B1 | * | 9/2003 | Burban et al. .................... 96/8 |

FOREIGN PATENT DOCUMENTS

EP 0517570 A1 * 12/1992
EP 0 752 265 A1 1/1997

* cited by examiner

*Primary Examiner*—Robert H. Spitzer
(74) *Attorney, Agent, or Firm*—Arent Fox, PLLC

(57) ABSTRACT

Spray-painting apparatus and method in which provision is made for: an inlet for the air under pressure; a heating unit for the compressed air; an air drying/separation unit including hollow-fiber membranes; adjustment of the heating of the treated air; adjustment of the pressure of the treated air; adjustment of either the dew point or the percentage of oxygen in the treated air in the case of hollow fiber membranes for nitrogen separation; and an outlet for the treated air to be used as paint carrier fluid.

35 Claims, 4 Drawing Sheets

FIG. N° 1

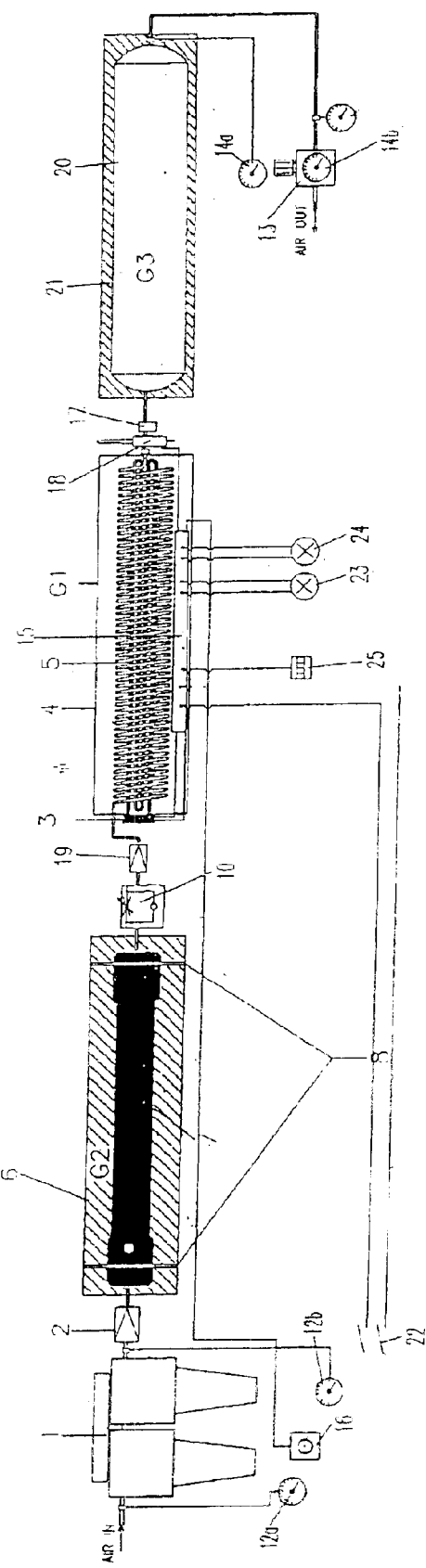

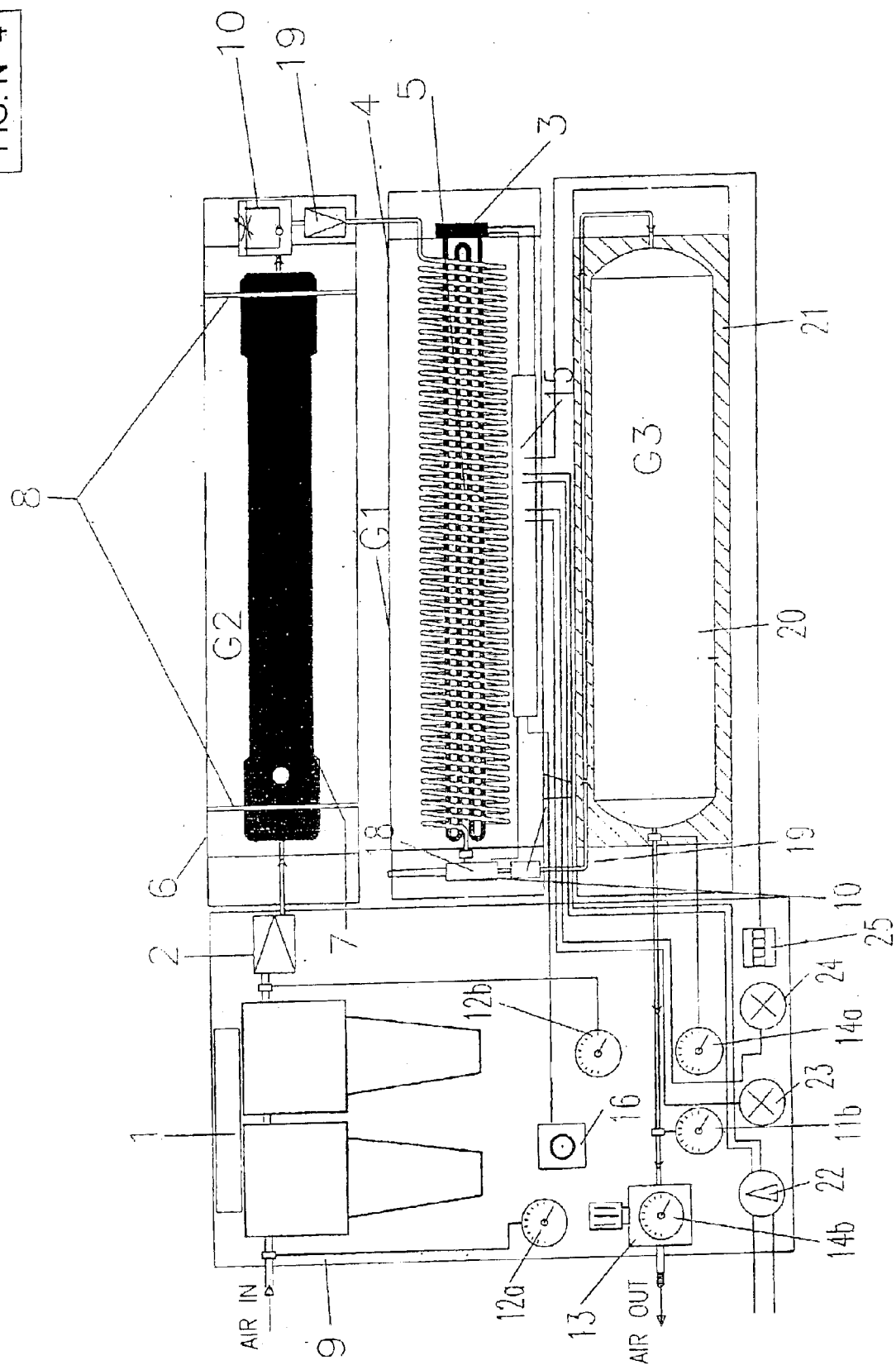

APPARATUS AND METHOD FOR SPRAY-PAINTING

BACKGROUND OF THE INVENTION

1. Field of the Invention

Figure 1:
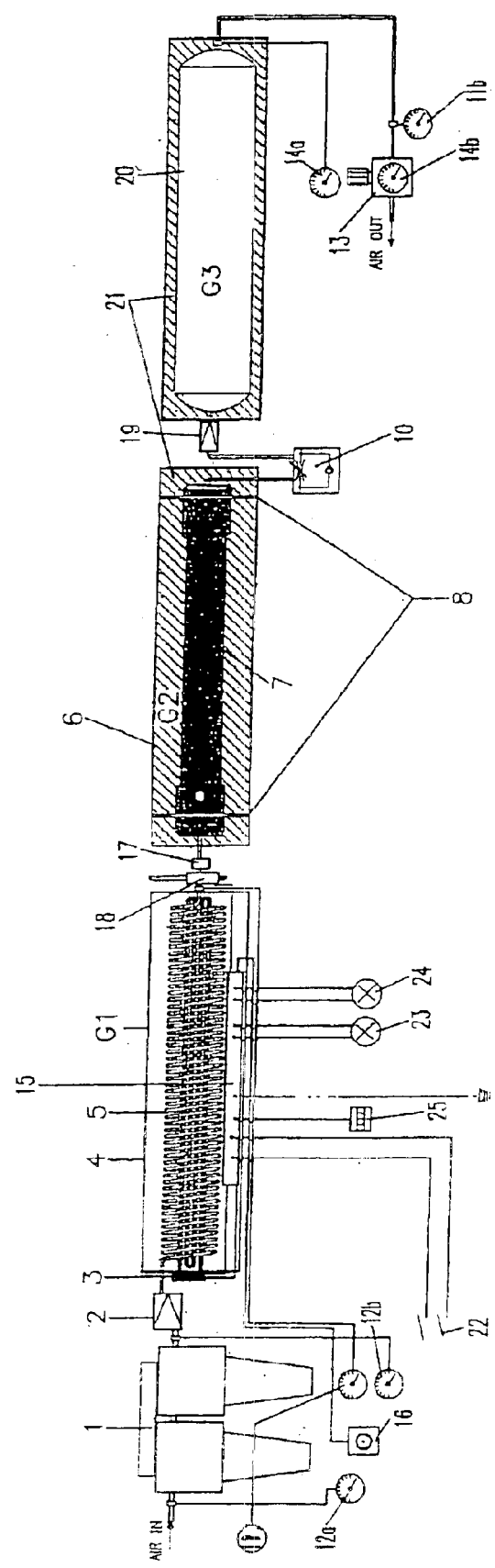

The present invention relates to a membrane apparatus for treatment of compressed air and production of dried air or, alternatively, modified nitrogen-rich air, which are free from impurities and have a high degree of drying, and in particular to a spray-painting apparatus using treated compressed air as a carrier fluid in spray-painting.

The invention offers the possibility of varying the exit temperature on use, in particular of the compressed dry air or modified nitrogen-rich air used as a carrier fluid in spray-painting devices.

2. Prior Art

It is known that spray-painting devices of known type consist of guns or nozzles, into which a flow of air under pressure (about 3–5 bars) and a supply of the paint to be sprayed are conveyed.

The air acts as a vector, entraining the paint therewith and transferring it to the surface to be painted.

Applicative examples of spray painting by compressed air are car bodies, furniture, articles made of plastic materials reinforced by incorporated fibreglass, boats, airplanes, leather articles in general, etc.

It is also known that in order to improve the painting quality, elimination of every impurity that may bind to the paint is required as well as making drying of the laid-down paint film as more as possible uniform and quick.

In this way, the possibilities that paint may absorb impurities and moisture from the compressed carrier air or even from ambient air are reduced, in particular if working takes place in an uncontrolled environment.

Therefore, in order to improve quality of painting, the compressed-air flow is dried to remove the condensate (making the air pass through a low-temperature refrigeration-cycle drier for example, generally until a dew-point value not lower than +3° C.) and filtered to eliminate traces of oil or other impurities (by filtering the air by means of coalescence filters or activated-carbon filters, for example).

In the spray-painting technique referred to as HVLP (high volumes, low pressure of the compressed air) also known is use of a flow of heated air for the purpose of accelerating paint drying and improve transfer efficiency, i.e. exploitation of the paint employed.

Systems of known type however have some drawbacks due to the fact that different paints and surfaces may require different spray conditions (in particular in terms of pressure and temperature of the carrier fluid).

It is the same as regards environmental conditions, since for instance work parameters may change to a great extent between a working carried out to a room temperature of +30° C. rather than of +5° C.

In addition, known systems are not always satisfactory when high purity of the compressed air and a high drying degree are required.

At all events, the painting systems of known type have the drawback that they are limited to use of air as the carrier fluid, and therefore involve a problem of possible oxidation of the paints.

SUMMARY OF THE INVENTION

Accordingly, it is a first aim of the present invention to propose a spray-painting apparatus using treated air, adapted to eliminate the above mentioned drawbacks.

It is another aim to propose an apparatus and method for spray-painting devices, which have a high yielding and are quite reliable in terms of characteristics of the dry compressed air or modified nitrogen-rich air, treated to the different temperatures.

It is a further aim to propose a spray painting apparatus of versatile use and ready adaptation in which hollow-fibre membranes are used to treat the compressed air by drying it, or hollow-fibre membranes to obtain modified air rich in nitrogen are used alternatively or in an interchangeable manner, in both cases being it possible to operate under different pressure and temperature conditions.

Advantageously, a carrier fluid of nitrogen-rich air in a concentration of nitrogen from 95 to 99.9% can be used for spray painting according to the invention.

According to the invention, the temperature of the nitrogen-rich treated air can be adjusted within the range of 5° to 60° C., obtaining a dew point which can vary from −40° C. and −80° C.

In this way, the treated air does not have oil impurities, humidity or other impurities which could be dangerous for the quality of painting.

Furthermore, the use of an anhydrous carrier fluid, which has high purity and adjustable temperature irrespective of the room temperature, allows a quick reticulation process of bi-component paints and a quick evaporation of volatile components.

A further aim of the present invention is to propose a method of spray-painting capable of eliminating the drawbacks of known systems.

The foregoing and still further aims are achieved by an apparatus for spray-painting comprising an inlet for air under pressure (AIR IN); a heating unit (G1) to heat the compressed air; an air-drying and/or separation unit (G2) operating by means of hollow-fibre membranes; means (3, 15, 16) for adjusting heating of the treated air; means (13) for adjusting pressure of the treated air; means (10, 19) for regulation of the dew point should the unit (G2) comprise hollow-fibre membranes for air drying, and/or for regulation of the residual percentage of oxygen in the treated air should the unit (G2) comprise hollow-fibre membranes for production of modified air rich in nitrogen; an outlet for the treated air (AIR OUT) to be used as paint carrier fluid.

Also disclosed is a spray-painting method comprising the steps of feeding air under pressure; adjustably heating the air to be treated; treating the heated air by separation membranes to a preestablished and adjustable drying/separation degree; supplying the treated air to an adjusted pressure and temperature as carrier fluid for the paint.

BRIEF DESCRIPTION OF THE DRAWINGS

Further features and advantages of the invention will become more apparent from the following detailed description of a preferred embodiment given by way of non-limiting example with the aid of the accompanying drawings, in which:

FIG. 1 is a diagram of a first embodiment of the apparatus in accordance with the invention;

FIG. 2 is a second embodiment of the apparatus of the invention;

FIG. 3 is a third embodiment of an apparatus in accordance with the invention;

FIG. 4 shows a fourth embodiment of the apparatus.

DESCRIPTION OF THE PREFERRED EMBODIMENTS

In accordance with the invention and with reference to the accompanying drawings, a spray painting apparatus comprises:

an inlet for the air under pressure "AIR IN";

a unit G2 for air treatment by means of hollow-fibre separation membranes;

a heating unit G1 to heat the air, placed either upstream of unit G2 (FIGS. 1 and 2) or downstream of said unit (FIGS. 3 and 4);

a storage unit G3 for the treated air, which is optional and is fitted between the outlet unit G2 and the use. Unit G3 preferably comprises a tank 20 with thermal insulation 21 to eliminate pressure oscillations at the exit following pulsations of the outgoing air during painting. Unit G3 can be inserted in a casing 26 preferably made of an extruded section member of aluminum, preferably of a cylindrical shape or square section;

an outlet for the treated air "AIR OUT" to be used as carrier fluid of the paint;

a thermometer 11 to measure and display the temperature of the air entering unit G2;

a pressure meter 14b to display and adjust the dried-air pressure produced by a pressure reducer 13;

a pressure meter 14a to display and control pressure in tank G3, if provided;

a flow regulator 10 downstream of the membrane unit G2 to either adjust the dew point of the dried air produced by G2 or vary the nitrogen percentage in the treated air;

a temperature regulator 16 to adjust the temperature of the air entering the air-drying unit G2;

a unit 15 for control of the pre-heating unit G1 based on adjustment of regulator 16.

In more detail, the apparatus may further comprise:

a three-way valve 18 controlled by the electronic control unit 15 and located upstream of the membrane unit G2 for exhaust of possible condensate;

a filtering unit 1 to filter the air under pressure to be supplied to the pre-heating unit G1;

instrumentation for control and operation;

a check-valve 2 for the air entering the pre-heating unit G1;

a check-valve 19 for the air coming out of the membrane unit G2, after the flow regulator 10;

a pressure meter 12a to gauge pressure of the air upstream of the filtering unit 1, a pressure meter 12b to gauge pressure of the air after the filtering unit 1.

More specifically:

the pre-heating unit G1 consists of a coil 5 wound around a resistor 3 and housed within a casing 4 preferably made of an extruded section member of aluminum, preferably of cylindrical shape or square section.

Alternatively, in the manufacture of said unit G1 coil 5 may also be eliminated making casing 4 operate as a tank for the air to be heated.

Preferably, coil 5 is a tube of copper or aluminum of a floating-spiral type and resistor 3 is of the armored type having a varying temperature controlled by a control diode or an electronic microprocessor circuit.

The drying unit G2 comprises a casing 6 preferably consisting of an extruded section member of aluminum, of cylindrical shape or square section for example, within which a membrane module 7 is housed for air drying, which is supported inside casing 6 by a pair of rings 8.

Preferably, casing 6 is of a type adapted to be opened and module 7 is of the interchangeable type so that it can be easily replaced, either by a nitrogen-separation module of same sizes for example or by another air-drying module.

The control instrumentation may comprise, in addition to thermometer 11 and pressure meter 14b, another pressure meter 14a for control of the air pressure in tank 20.

The filtering unit 1 is of the combined type, class 1 ISO 8573-1, to abate oil contents to values <0.001 mg/mc and oil vapor contents to values <0.003 mg/mc.

In operation (in the embodiment shown in FIGS. 1 and 2), the compressed air passes through the filtering unit 1, goes beyond the check valve 2 and enters coil 5 at the inside of casing 4.

On coming out of coil 5, the air passes through the three-way valve 18 discharging possible condensate and enters the air-drying unit G2 at the inside of casing 6.

Preferably, valve 18 operated by the electronic control unit 15 enables air passage through the membrane only on reaching of a predetermined threshold temperature regulated by a thermostat 17.

In the membrane, if it is of the type suitable for drying, drying of the air takes place, with dew-point values of the produced air that may range from 0° to −40° C.

The air from membrane 7 passes through the flow regulator 10, check valve 19 and subsequently the pressure reducer 13 and is stored in a storage chamber 20 ready for use, being for example destined to a spray-painting nozzle, passing through the pressure reducer 13.

In the embodiment shown in FIGS. 3 and 4, position of units G1 and G2 is reversed, so that air heating takes place after treatment by means of the membranes.

The control instrumentation, possibly gathered in a panel 9, enables checking of:

the temperature value at the membrane entry (thermometer 11 to which will correspond an exit temperature depending on cooling taking place in the particular membrane used (usually from about 15° C. to about 50° C.) measured by a thermometer 11b;

pressure at the exit of the apparatus (pressure meter 14b) and pressure at the exit of the filtering unit 1 (pressure meter 12b).

Therefore, depending on the desired application and final temperature of the treated air, it will be sufficient to act on regulator 16 to modify, by the electronic control unit 15, temperature of resistor 3 and consequently pre-heating of the air entering the membranes.

If the dew-point value is wished to be modified, it will be instead sufficient to act on the flow regulator 10.

Finally, pressure reducer 13 will be acted upon, if pressure of the dried air is wished to be adjusted.

Should the membrane unit 7 consist of a module for production of modified air rich in nitrogen, the flow regulator 10 itself enables purity of the produced nitrogen to be adjusted.

In addition, control and automatic adjustment of the operation values can be achieved by supplying the electronic control unit 15 with initial setting values and using a feedback of the measured temperature values at the entry or exit of the membranes, to automatically adapt heating of the air based on the temperature set value and the temperature actual value.

Likewise, setting and adaptive control of the pressure values and values of other parameters can be provided, such as the drying degree of the treated air or purity of the produced nitrogen, when such values are wished to be maintained under control.

Figure 2:
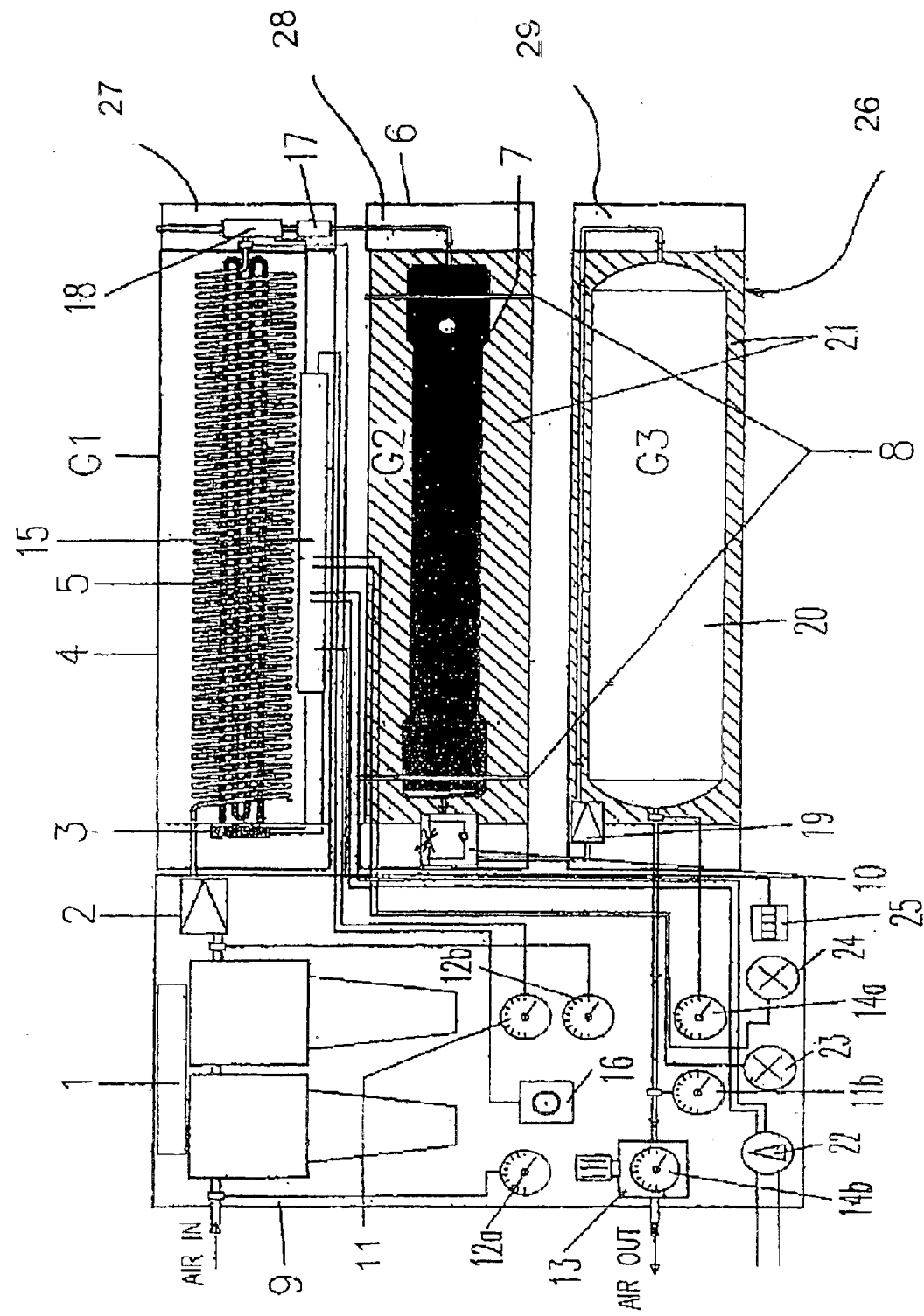

Shown in FIGS. 2 and 4 are embodiments of the apparatus in which casings 4, 6, 26 are superposed on each other and are all provided with lids 27, 28, 29 adapted to be opened to enable easy replacement of the respective units G1, G2, G3.

The apparatus may also comprise an on/off switch 22 for connection to the electric power network, and signalers such as pilot lights 23 and 24 to signal a stand-by state and a production state of the apparatus respectively, and a counter 25 to record the apparatus' work hours.

Advantageously, with an apparatus as shown in FIGS. 1 and 2 a further advantage is achieved, i.e. the quality of the air for painting is improved as well as efficiency of the air-drying/nitrogen-separation membrane.

In fact, the drying/separation membranes have a maximum efficiency at about 56° C. to which corresponds a temperature at the exit of about 15° C. to 40° C., and it is exactly in the neighborhood of 35° C. and 56° C. respectively, that the optimal values for many types of painting and for efficiency of the membranes are.

At all events, these average values are to be intended by way of example, since the operation values may depart therefrom depending on the type of membranes used and on the application of the apparatus.

Obviously many modifications and variations may be made to the apparatus as conceived, all of them falling within the inventive idea characterizing it. In particular, due to the use of hollow-fibre membranes, the apparatus may supply treated air to values that are steady and adjustable both as regards temperature and pressure and as regards purity, in many other applications (medical applications, for example).

What is claimed is:

1. A method of spray-painting comprising the steps of:
   sending a jet under pressure of a carrier fluid for paint therein to be sprayed;
   mixing a paint flow with the jet of the carrier fluid under pressure to obtain a mixture;
   spraying the obtained mixture onto an object to be painted;
   wherein said carrier fluid includes modified air rich in nitrogen.

2. The method as claimed in claim 1, wherein said modified air is obtained by separation by means of hollow-fiber separation membranes.

3. The method according to claim 2, wherein said modified air rich in nitrogen is obtained by the following steps:
   feeding a compressed air flow;
   adjustably heating the compressed air flow;
   treating the heated compressed air flow by the hollow-fiber separation membranes to enrich the compressed air flow with nitrogen to a pre-established and adjustable separation degree;
   spraying modified air to an adjusted pressure and temperature as the carrier fluid.

4. The method as claimed in claim 3, wherein the step of treating the heated compressed air flow is carried out until air-purity values of 90–99.5% in nitrogen are reached.

5. The method as claimed in claim 3, wherein the steps of adjustably heating the compressed air flow, and treating the heated compressed air flow are automatically adapted based on pre-established temperature, purity and pressure values of the compressed air flow to be fed and on measured temperature, purity and pressure values of the fed air flow.

6. The method as claimed in claim 3, wherein the step of feeding the compressed air flow is carried out to an air temperature between 15° C. and 50° C.

7. A method of spray-painting comprising the steps of:
   sending a jet under pressure of a carrier fluid for a paint to be sprayed;
   mixing a paint flow with the jet of the carrier fluid under pressure; and
   spraying the obtained mixture onto an object to be painted;
   wherein said carrier fluid comprises heated dried air obtained by means of air drying hollow-fiber membranes.

8. The method as claimed in claim 7, wherein said heated dried air is obtained by the following steps:
   feeding air under pressure to the hollow-fiber membranes;
   adjustably heating the air; and
   treating the heated air by air drying hollow-fiber membranes to a pre-established and adjustable drying degree.

9. The method as claimed in claim 8, wherein the treating is a step of drying until dew-point values of the dried air in the range of 0° to −40° are reached as the pre-established and adjustable drying degree.

10. A spray-painting apparatus comprising:
    an inlet for admitting a flow of compressed air;
    a heating unit to heat the compressed air;
    a separation unit comprising hollow-fiber membranes for production of treated air rich in nitrogen;
    means for adjusting heating of the treated air;
    means for adjusting pressure of the treated air;
    means for regulating a residual percentage of oxygen in the treated air; and
    an outlet for the treated air to be exhausted as paint carrier fluid.

11. The apparatus as claimed in claim 1, further comprising a thermometer to measure and display a temperature of the compressed air entering the separation unit.

12. The apparatus as claimed in claim 1, further comprising a pressure meter to display and adjust pressure of the treated air.

13. The apparatus as claimed in claim 12, wherein said means for adjusting pressure of the treated air comprises a pressure reducer associated with the pressure meter.

14. The apparatus as claimed in claim 1, further comprising a three-way valve upstream of the separation unit.

15. The apparatus as claimed in claim 1, further comprising a filtering unit for air destined to the separation unit.

16. The apparatus as claimed in claim 15, further comprising a pressure meter to gauge the air pressure upstream of the filtering unit.

17. The apparatus as claimed in claim 15, wherein the filtering unit is of a combined type class 1 ISO 8573-1, for oil contents<0.001 mg/mc and oil vapor contents<0.003 mg/mc.

18. The apparatus as claimed in claim 1, further comprising an instrumentation panel.

19. The apparatus as claimed in claim 1, further comprising a check valve for the compressed air entering the heating unit.

20. The apparatus as claimed in claim 1, further comprising a check valve for the treated air coming out of the separation unit.

21. The apparatus as claimed in claim 1, wherein the heating unit comprises a resistor around which a coil is wound for air passage, the resistor and coil being housed within a cylindrical casing.

22. The apparatus as claimed in claim 21, wherein the coil comprises a tube of copper or aluminum of a floating-spiral type.

23. The apparatus as claimed in claim 22, wherein said means for adjusting heating of the compressed comprises a temperature regulator for the compressed air entering the separation unit, and an electronic unit for control of the resistor of the heating unit based on adjustment of the regulator.

24. The apparatus as claimed in claim 21, wherein the resistor is of an armored type with a varying temperature.

25. The apparatus as claimed in claim 24, wherein the resistor is controlled by a control diode or an electronic microprocessor circuit.

26. The apparatus as claimed in claim 21, wherein said casing comprises an extruded section member made of aluminum.

27. The apparatus as claimed in claim 1, wherein the heating unit comprises a resistor placed within a cylindrical casing communicating with the inlet and the separation unit.

28. The apparatus as claimed in claim 1, further comprising means for adjusting purity of the treated air including a flow regulator placed downstream of the separation unit.

29. The apparatus as claimed in claim 1, wherein the separation unit comprises a casing having an extruded section member made of aluminum, within which a membrane module for air drying/separation is housed, said module is being supported in the casing by a pair of rings.

30. The apparatus as claimed in claim 29, wherein the casing can be opened and the module is of an interchangeable type so that the module can be easily replaced.

31. The apparatus as claimed in claim 1, further comprising a filtering unit, a panel including a thermometer, a first pressure meter, a pressure reducer, a flow regulator, a temperature regulator and a second pressure meter for control of air pressure upstream of the filtering unit.

32. The apparatus as claimed in claim 1, wherein said heating unit is placed upstream of said separation unit.

33. The apparatus as claimed in claim 1, wherein said heating unit is placed downstream of said separation unit.

34. The apparatus as claimed in claim 1, further comprising a storage unit for the treated air.

35. The apparatus as claimed in claim 34, wherein said storage unit comprises a storage chamber with a thermal insulation.

* * * * *

UNITED STATES PATENT AND TRADEMARK OFFICE
CERTIFICATE OF CORRECTION

PATENT NO. : 6,821,315 B2
DATED : November 23, 2004
INVENTOR(S) : Ottavio Milli

It is certified that error appears in the above-identified patent and that said Letters Patent is hereby corrected as shown below:

Column 6,
Lines 30, 34, 39, 41, 50, 52, 55 and 58, change "claim 1" to -- claim 10 --.

Column 7,
Lines 12, 15 and 18, and change "claim 1" to -- claim 10 --.

Column 8,
Lines 6, 10, 12 and 14, change "claim 1" to -- claim 10 --.

Signed and Sealed this

Fourteenth Day of June, 2005

JON W. DUDAS
*Director of the United States Patent and Trademark Office*